H. HARDISTY.
CHOKER HOOK.
APPLICATION FILED JULY 29, 1914.

1,141,333.

Patented June 1, 1915.

WITNESSES
Jas. K. McCathran
H. T. Riley

Henry Hardisty, INVENTOR
BY E. G. Siggers
ATTORNEY

UNITED STATES PATENT OFFICE.

HENRY HARDISTY, OF RAYMOND, WASHINGTON, ASSIGNOR OF ONE-HALF TO ELIAS PIERSON, OF SOUTH BEND, WASHINGTON.

CHOKER-HOOK.

1,141,333.   Specification of Letters Patent.   Patented June 1, 1915.

Application filed July 29, 1914. Serial No. 853,839.

*To all whom it may concern:*

Be it known that I, HENRY HARDISTY, a citizen of the United States, residing at Raymond, in the county of Pacific and State of Washington, have invented a new and useful Choker-Hook, of which the following is a specification.

The invention relates to improvements in logging hooks.

The object of the present invention is to improve the construction of logging hooks and to provide a simple, practical and efficient choker hook of strong and durable construction, adapted to grip a line and hold the same securely around a log, so that it will be impossible for the log to run through the line or the latter to slip over the end of the log.

A further object of the invention is to provide a hook of this character equipped with a line or cable clamping member provided with logging means adapted to be easily and quickly operated to fasten and unfasten the clamping member and capable of effectually preventing the device from accidentally unhooking while logging on extremely rough ground.

It is also an object of the invention to provide a closed choker hook which will not clog or foul with mud and which will effect a saving of time and labor and lessen the expense of handling logs.

With these and other objects in view the invention consists in the construction and novel combination of parts hereinafter fully described, illustrated in the accompanying drawing, and pointed out in the claims appended hereto, it being understood that various changes in the form, proportion, size and minor details of construction, within the scope of the claims, may be resorted to without departing from the spirit or sacrificing any of the advantages of the invention.

Figure 1:
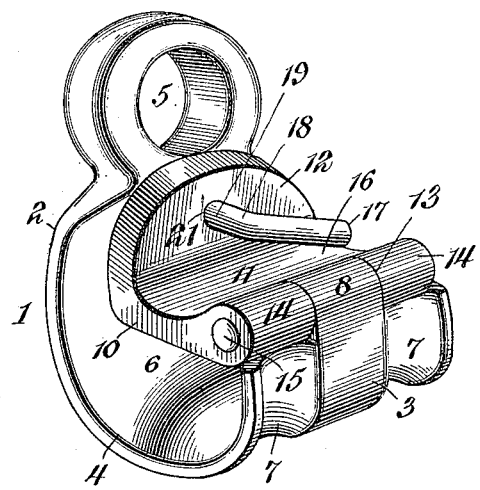
Figure 3:
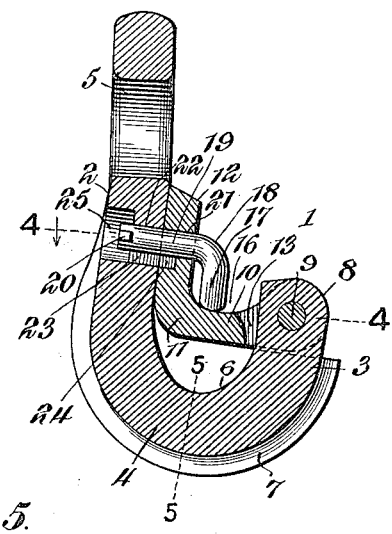
Figure 2:
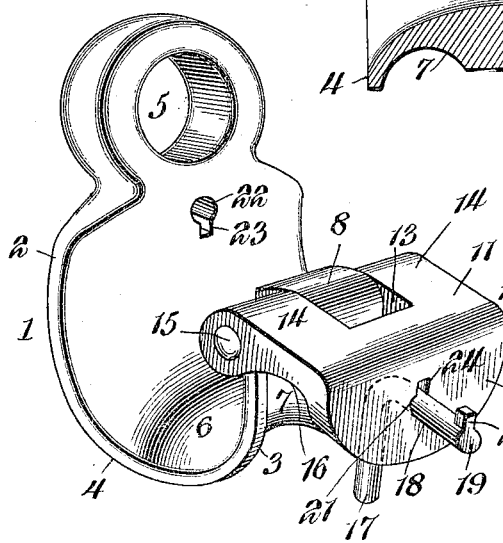
Figure 5:
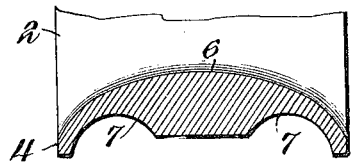
Figure 4:
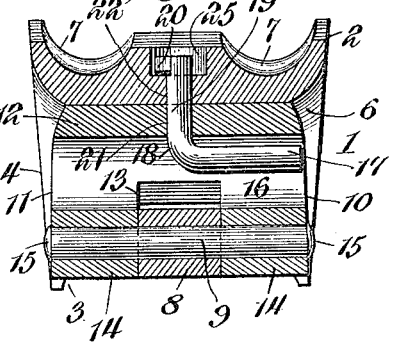

In the drawing:—Figure 1 is a perspective view of a choker hook constructed in accordance with this invention, the clamping member being closed. Fig. 2 is a similar view, the clamping member being open.
Fig. 3 is a longitudinal sectional view, the parts being arranged as shown in Fig. 1. Fig. 4 is a horizontal sectional view taken substantially on the line 4—4 of Fig. 3. Fig. 5 is a detail sectional view on the line 5—5 of Fig. 3.

Like numerals of reference designate corresponding parts in all the figures of the drawing.

In the accompanying drawing, in which is illustrated the preferred embodiment of the invention, 1 designates a hook designed to be constructed of tool steel or other suitable material and consisting of an extended side or shank portion 2, a short side or bill 3, and a connecting bottom portion 4. The sides and bottom portion constitute the body of the hook, which is comparatively broad to provide a relatively large surface for engaging a line or cable (not shown). The extended side or shank 2 is provided at the top or outer end with an integral eye 5 for the attachment of one end of the line or cable, and the connecting bottom portion 4 is curved longitudinally of the hook to receive and conform to the configuration of a line or cable, and it is also curved transversely to present a convex inner face 6 to the same. The body of the hook is preferably provided at its outer face with exterior longitudinal grooves 7 to lighten the structure, but these may or may not be employed. The hook is designed to be constructed of different sizes to suit different diameters of lines or cables, and the short side or bill 3 is reduced at opposite sides of the body to form an upwardly projecting eye 8 for the reception of a pintle 9 which hinges a clamping member 10 to the side or bill 3 of the hook. The clamping member 10, which is approximately L-shaped, consists of a jaw 11 provided at the inner portion with an upwardly extending lip or flange 12, and bifurcated at the outer portion to form a central recess 13 to straddle the eye 8 and having spaced eyes 14 located at opposite sides of the eye 8 and receiving the terminal portions of the pintle 9, which is preferably headed at its ends 15.

The clamping member, which swings inwardly and outwardly in the longitudinal plane of the hook, is adapted to engage and frictionally grip a cable or line, which is firmly held between the inner or lower face of the jaw of the clamping member and the inner or upper face of the bottom connecting portion 4 of the hook. The upwardly extending lip or flange 12, which is preferably of segmental form, is arranged substantially at right angles to the jaw or engaging portion 11, and has a flat inner face to fit against the inner face of the extended side or shank of the hook when the clamping member is in its closed position. The jaw, which extends across the mouth or entrance of the hook, is located below the upper or outer end of the short side or bill 3 of the hook, and the said jaw is provided in its upper or outer face with a transverse groove 16, adapted to receive the terminal portion of a gravity arm 17 of a key 18, which locks the clamping member in its closed or engaging position.

The key 18 is provided with a stem 19 arranged at right angles to the gravity arm and having a laterally projecting lug 20. The stem, which is round, is slidably mounted in a circular opening 21 in the lip or flange 12, and it is adapted to extend through an opening 22 in the extended side or shank of the hook. The opening 22 is provided at the bottom with a reduced extension or recess 23, which forms a passage way for the lug 20 when the latter, through the rotary movement of the stem, is brought to the bottom thereof opposite the recess 23. The lip or flange 12 is provided at its inner face with a recess 24, located at the bottom of the round opening 21 and registering with the recess 23 when the clamping member is closed, and adapted to permit the stem of the key to be drawn outward a sufficient distance to arrange its inner end in substantially flush relation with the inner face of the lip or flange to carry the said stem and the lug clear of the extended side or shank of the hook. When the key is in this position, the clamping member is unlocked and may be swung to its open position. When the clamping member is closed, the stem of the key is adapted to be moved inwardly or rearwardly to carry the lug 20 through the reduced branch or recess 23 into a rear recess or enlargement 25, of sufficient size to permit the lug to be carried away from the recess 23 by a partial rotary movement of the stem. The recess 25 is preferably circular and the gravity arm 17, which extends from the stem in a direction approximately diametrically opposite the lug 20, is adapted, when swung downwardly into the exterior groove 16 of the jaw of the clamping member, to maintain the lug 20 out of alinement with the recess 23. The gravity arm is adapted to swing to either side to carry the lug 20 away from the recess 23 to lock the key in engagement with the extended side or shank of the hook, and the clamping member constitutes a guard for protecting the key, which cannot become accidentally unlocked, as it is necessary to elevate the gravity arm to a central vertical position and then draw the key outwardly. As the clamping member is securely locked when the gravity arm is at either side of the hook, it is unnecessary to employ a spring in the locking mechanism. When the cable to which the choker hook is connected is placed under tension, there is a strain on the clamping member sufficient to prevent rotary movement of the operating arm of the locking device, and the latter will not oscillate out of the protecting groove of the clamping member when the device is not in use.

What is claimed is:

1. A choker hook of the class described including a hook, clamping means for gripping a line or cable at any point to prevent the same from slipping longitudinally through the hook, said means comprising a clamping member hinged to the bill of the hook and arranged to swing inwardly and outwardly to and from the shank, said clamping member having a line or cable gripping jaw extending across the space between the bill and the shank and arranged to coöperate with the bottom of the hook in gripping the line or cable, and means for securing the clamping member in such frictional engagement with the line or cable.

2. A choker hook of the class described including a hook, clamping means for gripping a line or cable at any point to prevent longitudinal movement of the same through the hook, said means comprising a substantially L-shaped clamping member hinged to the bill and arranged to swing inwardly and outwardy to and from the shank, said clamping member being composed of a straight jaw extending across the space between the bill and the shank and arranged to coöperate with the bottom of the hook in gripping the line or cable, and a lip or flange extending outwardly from the inner end of the jaw and fitting against the inner face of the shank when the clamping member is closed, and locking means for securing the lip or flange to the shank.

3. A choker hook of the class described including a hook, a clamping member hinged to the bill of the hook and arranged to swing inwardly and outwardly to and from the shank of the hook, and a key having a smooth stem mounted for sliding and rotary movement on the said member and provided with means for engaging the shank, said key having an operating arm arranged to maintain the key in its engaging position, and the said clamping member being constructed to receive and form a guard for the gravity arm to prevent the same from being displaced when the hook is dragged over the ground.

4. A device of the class described including a hook, a substantially L-shaped clamping member hinged to the bill of the hook and arranged to swing inwardly and outwardly to and from the shank of the hook, said clamping member being provided adjacent to its angle with an exterior groove, and a key mounted for sliding and rotary movement on the clamping member and provided with means for engaging the shank, said key having a gravity operating arm normally arranged in the groove of the clamping member, which forms a shield to prevent the gravity operating arm from being displaced when the choker hook is dragged over the ground.

5. A device of the class described including a hook provided in the rear face of its shank with an enlarged recess and having an opening extending from the recess to the front face of the shank and provided at one side with a reduced extension, a clamping member hinged to the bill of the hook and provided with a lip or flange arranged to bear against the shank, said lip or flange having an opening registering with the opening of the shank and enlarged at the rear face of the said lip or flange to provide a recess, and a key having a smooth stem mounted for rotary and longitudinal sliding movement in the lip or flange and provided with a lug of a size to be received within the recess of the lip or flange and also to pass through the extension of the opening in the shank, whereby the clamping member may be locked to the shank by carrying the lug out of alinement with the said extension of the opening, said key having an operating arm and the clamping member being arranged to form a shield for the same to prevent the operating arm from being displaced when the hook is dragged over the ground.

In testimony, that I claim the foregoing as my own, I have hereto affixed my signature in the presence of two witnesses.

HENRY HARDISTY.

Witnesses:
 OREN C. WILSON,
 PETER PEARSON.

Copies of this patent may be obtained for five cents each, by addressing the "Commissioner of Patents, Washington, D. C."